T. UTLEY.
SHIP'S LIGHT.
APPLICATION FILED MAR. 20, 1918.
1,266,356.
Patented May 14, 1918.
2 SHEETS—SHEET 1.
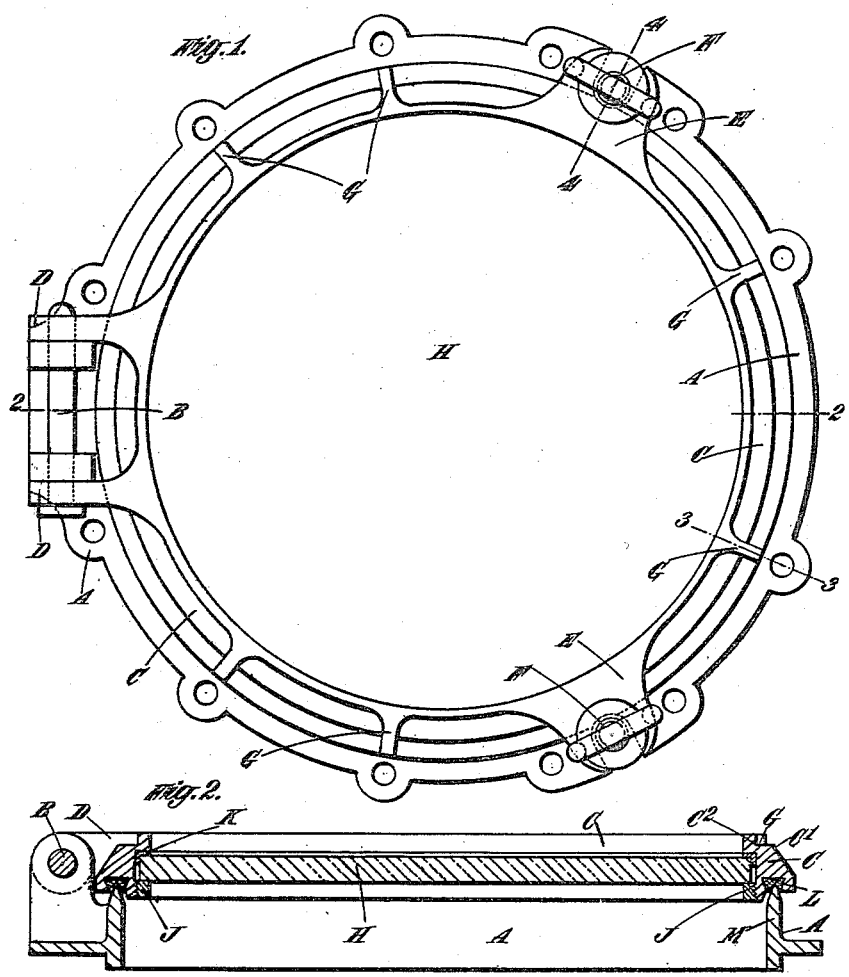
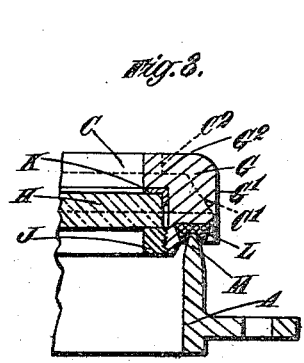
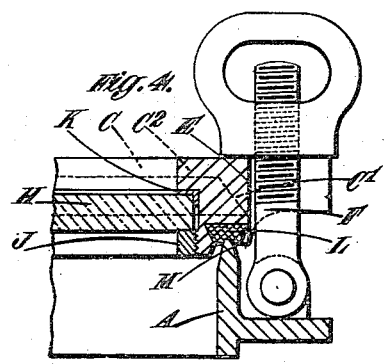
Inventor.
Thomas Utley T. UTLEY.
SHIP'S LIGHT.
APPLICATION FILED MAR. 20, 1918.
1,266,356.
Patented May 14, 1918.
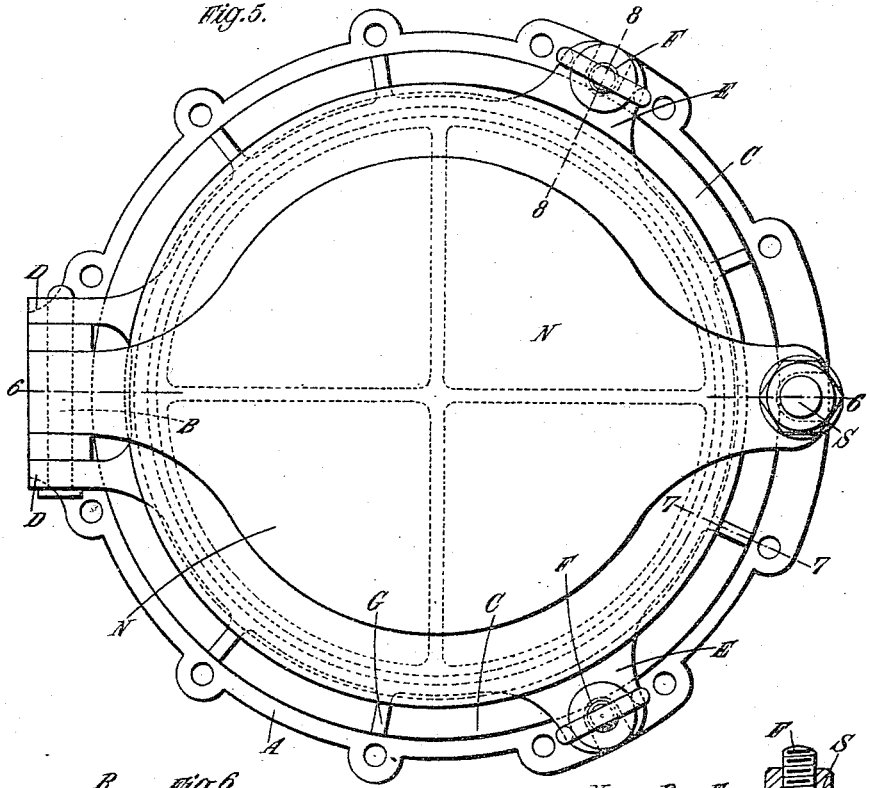
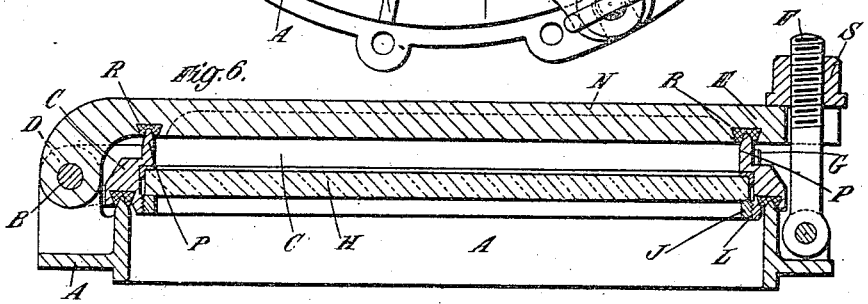
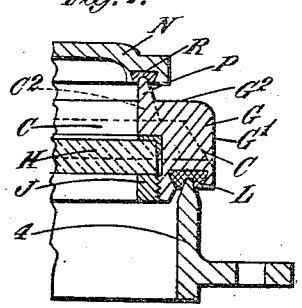
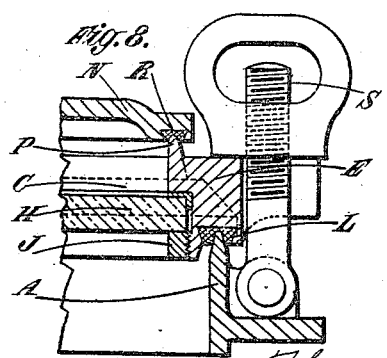
Inventor.
Thomas Utley

UNITED STATES PATENT OFFICE.

THOMAS UTLEY, OF WEST DERBY, LIVERPOOL, ENGLAND.

SHIP'S LIGHT.

1,266,356.

Specification of Letters Patent.

Patented May 14, 1918.

Application filed March 20, 1918. Serial No. 223,607.

*To all whom it may concern:*

Be it known that I, THOMAS UTLEY, a subject of the King of Great Britain, residing at Sefton House, Crosby Green, West Derby, Liverpool, in the county of Lancaster, England, have invented certain new and useful Improvements in or Relating to Ships' Lights, of which the following is a specification.

This invention relates to ships' lights and has more particular reference to such lights, in which the glass holder is hinged to a fixed frame so as to be opened for ventilation or other purposes, and to be closed by means of bolts or other readily manipulated clamping or retaining means.

The chief object of the present invention is to enable a comparatively thin glass plate to be employed with safety in conjunction with a glass holder of special construction as hereafter described and of light weight. Usually the glass plate in a ship's light is at least one inch in thickness to withstand the strains to which it is liable to be subjected. In order to employ a thinner glass plate, for instance a plate of one half inch in thickness, it is essential that the strength and rigidity of the light should not be reduced and on the other hand is not desirable to employ a heavy glass holder. Therefore the present invention has been devised for the purpose of producing a ship's light in which a thin glass plate is retained in a holder of small weight which is so constructed as to resist any deformation or bending when strain is put thereon—as for instance when it is either being clamped into the closed position or when it is subjected to rough sea conditions—so that the strain is not transmitted to the glass plate but is equally distributed throughout the circumference of the glass holder.

According to this invention the holder or frame which receives the thin glass plate is provided or formed with webs, lugs, projections or the like so constructed and arranged that they impart considerable strength and rigidity to the holder. The cross sectional area of the glass holder at any one of the webs is substantially greater than that at any adjacent part of the holder. The strengthening webs, or the like are preferably used in conjunction with the type of hinge lug and retaining lug described in the specification of my prior British Patent No. 25893 of 1909 which hinge lugs and retaining lugs are so constructed as to be considerably strengthened and thus effectively resist deformation or bending when any strain is put on them.

In order that the said invention may be clearly understood and readily carried into effect the same will now be described more fully with reference to the accompanying drawings, in which:—

Figure 1 is a front view of one construction of the improved ship's light.

Fig. 2 is a transverse section on the line 2—2 of Fig. 1.

Figs. 3 and 4 are enlarged sectional views taken respectively on the lines 3—3 and 4—4 of Fig. 1.

Figs. 5, 6, 7 and 8 are similar views to Figs. 1, 2, 3 and 4 showing a cover or dead light applied to the ship's light.

A is the usual fixed frame which is secured to the ship's side or on the wall of a deck cabin, and which carries the hinge pin B that supports the movable glass holder C. As aforesaid the hinge lugs D D and also the retaining lugs E E which are forked to receive the swing bolts F F that secure the glass holder in the closed position, are of the kind set forth in the specification of my prior British Patent No. 25893 of 1909.

The section of the glass holder C between the hinge lugs D D and the retaining lugs E E is such that the outer surface of the glass holder is formed with a beveled surface $C'$ and an upstanding flange $C^2$ as shown in Fig. 2 except at certain points where the aforesaid strengthening webs, projections or lugs G G are disposed. These webs or the like in the examples shown are in the form of narrow radially disposed portions cast or formed integrally with the glass holder, and are so shaped that their outer surfaces $G'$ $G^2$ are at right angles thus a section taken at a point on the glass holder through one of the webs is of substantially square or rectangular formation as shown in Fig. 3 so that the cross sectional area at the webs is greater than the cross sectional area at the adjacent parts of the glass holder. The number and disposition of the strengthening webs depend upon the size of the light to which they are applied, for instance in a light of 12″ diameter there are six webs arranged around the glass holder with relation to the hinge lugs and the retaining lugs as shown in Fig. 1.

The webs G impart considerable strength to the glass holder without increasing the weight thereof and prevent the glass holder from being strained or distorted so that a comparatively thin glass plate H may be used without fear of breakage. The glass plate may be retained in the holder C in any suitable manner, for example by means of a screwed ring J which holds the glass plate against an annular abutment K formed on the glass holders. The usual rubber ring L is provided or embedded in the glass holder to bear against a flange M on the frame A.

If desired a hinged cover N of any usual type may be provided, as shown in Figs. 5 and 6 in which case the glass holder is provided with an upstanding flange P adapted to bear against a rubber ring R embedded in the cover, the latter being retained in the closed position by bolts S as shown in Figs. 5 and 6. Although the invention is especially suitable for enabling a thin glass plate to be used, it will be understood that a glass holder strengthened in the manner aforesaid can be adapted generally so that it is not limited to use in combination with a thin glass plate.

What I claim and desire to secure by Letters Patent of the United States is:—

A ship's light comprising a frame, an annular glass holder having a beveled outer face, hinge lugs rigid with and extending from one side of said glass holder and pivoted on the frame, said glass holder having spaced radial webs for strengthening the holder, and retaining lugs rigid with and extending from the glass holder.

THOMAS UTLEY.

Copies of this patent may be obtained for five cents each, by addressing the "Commissioner of Patents, Washington, D. C."